US012584823B2

(12) United States Patent
Fank

(10) Patent No.: US 12,584,823 B2
(45) Date of Patent: Mar. 24, 2026

(54) METHOD FOR REGULATING A TEST BENCH ARRANGEMENT

(71) Applicant: AVL List GmbH, Graz (AT)

(72) Inventor: Daniel Fank, Graz (AT)

(73) Assignee: AVL List GmbH, Graz (AT)

( * ) Notice: Subject to any disclaimer, the term of this patent is extended or adjusted under 35 U.S.C. 154(b) by 310 days.

(21) Appl. No.: 18/564,293

(22) PCT Filed: May 23, 2022

(86) PCT No.: PCT/AT2022/060177
§ 371 (c)(1),
(2) Date: Nov. 27, 2023

(87) PCT Pub. No.: WO2022/246487
PCT Pub. Date: Dec. 1, 2022

(65) Prior Publication Data
US 2024/0241016 A1 Jul. 18, 2024

(30) Foreign Application Priority Data

May 25, 2021 (AT) .............................. A 50413/2021

(51) Int. Cl.
*G01M 99/00* (2011.01)
*G01M 13/025* (2019.01)
*G01M 15/04* (2006.01)

(52) U.S. Cl.
CPC ........ *G01M 99/005* (2013.01); *G01M 15/042* (2013.01)

(58) Field of Classification Search
CPC ......... G01M 17/0072; G01M 17/0074; G01M 17/007; G01M 13/025; G01M 17/0078;
(Continued)

(56) References Cited

U.S. PATENT DOCUMENTS

| 11,726,004 | B2 * | 8/2023 | Bier | ..................... G01M 15/042 |
| | | | | 73/862.191 |
| 2022/0326116 | A1 * | 10/2022 | Bier | ................... G01M 13/025 |

FOREIGN PATENT DOCUMENTS

| AT | 512104 A3 * | 7/2014 | ......... G01M 13/026 |
| AT | 519092 A4 | 4/2018 | |

(Continued)

OTHER PUBLICATIONS

Reale, G. et al. "Nonlinear observers for closed-loop control of a combustion engine test bench." 2009 American Control Conference (2009): 4648-4653.

*Primary Examiner* — Andre J Allen
(74) *Attorney, Agent, or Firm* — Dykema Gossett PLLC

(57) ABSTRACT

In order to provide a method that improves on the prior art for controlling a test bench arrangement in which a rotating specimen is connected to a rotating loading machine via a mechanical shaft connection and in which at least one angular velocity prevailing in the test bench arrangement is measured, the rotational behavior of the test bench arrangement and thus the dynamic behavior at least of the measured angular velocity and of a specimen angular velocity ($\omega$P) prevailing in the specimen is first of all modeled using a first system of differential equations. Building on this, the specimen torque (TP) generated by the specimen is modeled using a second system of differential equations, a state observer for estimating the specimen angular velocity ($\omega$P) and the specimen torque (TP) is designed on the basis of the first and second system of differential equations, estimates of the specimen angular velocity ($\omega\hat{}\_P$) and of the specimen torque ($\hat{T}\rho$) are determined by means of the state observer, and the determined estimates are used to control at least one
(Continued)

control angular velocity prevailing in the test bench arrangement (4) and/or at least one control torque prevailing in the test bench arrangement.

6 Claims, 6 Drawing Sheets

(58) Field of Classification Search
CPC ...... G01M 13/02; G01M 15/02; G01M 13/00;
G01M 13/027; G01M 17/06; G01M
99/007; G01M 99/008; G01M 15/044;
G01M 17/02; G01M 17/022; G01M
17/04; G01M 99/002; G01M 15/05;
G01M 15/102; G01M 15/108; G01M
17/00; G01M 17/045; G01M 5/0075;
G01M 9/04; G01M 15/14; G01M 17/08;
G01M 99/00; G01M 1/10; G01M 13/04;
G01M 15/04; G01M 15/09; G01M
17/0076; G01M 17/013; G01M 17/021;
G01M 17/065; G01M 3/26; G01M 7/025;
G01M 7/027; G01M 7/06; G01M 9/062;
G01M 3/02; G01M 3/025; G01M 3/2876;
G01M 3/3236; G01M 3/329; G01M 9/00;
G01M 9/02; G01M 9/06; G01M 9/067;
G01M 99/004
USPC ...................................................... 73/118.01
See application file for complete search history.

(56) References Cited

FOREIGN PATENT DOCUMENTS

| | | | | | |
|----|----|----|---|--------|-----------|
| AT | 522354 | A4 | | 10/2020 | |
| DE | 102008041883 | A1 | | 3/2010 | |
| DE | 102016123629 | A1 | * | 6/2018 | .......... G01M 17/007 |
| DE | 10162004 | B4 | * | 2/2020 | .......... G01M 13/021 |
| DE | 102020104314 | A1 | | 5/2020 | |
| DE | 102018128984 | B4 | * | 9/2022 | |
| DE | 102020208040 | B4 | * | 8/2024 | .......... G01M 13/025 |
| JP | 2013053978 | A | * | 3/2013 | |
| WO | 2021026578 | A1 | | 2/2021 | |

* cited by examiner

METHOD FOR REGULATING A TEST BENCH ARRANGEMENT

CROSS-REFERENCE TO RELATED APPLICATION

This application is a national stage filing based upon International application No. PCT/AT2022/060177, filed 23 May 2022, which claims the benefit of priority to Austria application No. A50413/2021, filed 25 May 2021.

BRIEF SUMMARY

The present invention pertains to a method for controlling a test bench arrangement in which a rotating specimen is connected to a rotating loading machine via a mechanical shaft connection and in which at least one angular velocity prevailing in the test bench arrangement is measured, the rotational behavior of the test bench arrangement and thus the dynamic behavior at least of the measured angular velocity and of a specimen angular velocity prevailing in the specimen being modeled using a first system of differential equations.

BACKGROUND

Test benches have long been an indispensable aid in the most varied technological fields of application. This is especially true for the automotive industry, where trends as the electrification of the power train, with ever shorter innovation cycles, continuously lead to new challenges in terms of testing technology. In this context, the requirements for lower costs, higher flexibility, shorter set-up times and higher dynamics, which are dominant factors in many of these new test challenges, can be emphasized.

Many parallels can be drawn between the factors mentioned. Firstly, costs can be reduced primarily by reducing hardware installed in a test bench. In this regard, particularly measurement and sensor devices can be mentioned, which in many cases are to be regarded as expensive components on the one hand, and on the other hand can significantly increase the implementation, startup and maintenance expenses for a test bench. Furthermore, in a predominant number of applications, a reduced number of sensors can significantly increase the flexibility of a test bench. A decisive factor in this context is a reduced wiring complexity, usually associated with reduced sensors, which can be advantageous in particular in the case of modifications and/or adaptations of test bench hardware. For the same reasons, a smaller number of sensors often also allows a shortening of set-up times occurring when the test specimens are changed.

In contrast, the fourth factor mentioned, the requirement for higher dynamics, in many cases leads to a different conclusion with regard to the number of sensors to be provided. In this case, the term "dynamics" is understood to mean changes of non-steady operating states, i.e., changes of certain variables of the test bench arrangement, such as a rotational speed or a torque, in short time intervals, for example in the millisecond or even microsecond range. Large changes of such variables can also occur. For highly dynamic operation of a test bench, it is often of decisive importance to be informed as precisely as possible about the state of a test bench, in order to ultimately enable a highly dynamic control of the test bench arrangement. In this context, each additional measured variable can be helpful or even necessary. This contradiction with regard to the number of sensors to be provided occurs in a very wide variety of testing applications.

For example, in the case of drive train test benches, a drive train to be tested is arranged on the test bench as a specimen, and is usually connected via multiple mechanical connection shafts to at least one loading machine (dynamometer). The drive unit of the drive train, for example an internal combustion engine and/or an electric motor, then operates on the test bench against the at least one loading machine, in order to test different load states to be expected in real operation. Such a drive train test bench having multiple loading machines is known for example from DE 102008,041,883 A1. In such cases, it is often helpful to know precisely about the torques output by the loading machines, e.g., in order to avoid transverse influences between the loading machines.

In the case of engine test benches, in contrast, usually only one single drive unit, for example an internal combustion engine and/or an electric motor, is provided as a specimen and is connected to a load machine (dynamometer) by means of a shaft connection. An example, to be highlighted in such cases, for an operating mode in which additional measurement information can be of decisive importance is what is known as damping control, as is known for example from AT 519092 A4. In this case, a common aim is to determine a damping portion of a control signal used for test bench control, from the current rotational speed of the specimen, also referred to in the following as a "specimen rotational speed," and/or the specimen torque generated by the specimen. In this case, measured variables of specimen rotational speed and/or specimen torque significantly simplify the implementation of the control concept.

In addition to the desire to reduce expensive and complex sensors for cost and efficiency reasons, it is often the case that it is simply not possible to measure certain measured variables, such as the angle of rotation of a specimen, its rotational speed, or the specimen torque generated by it, with sufficient accuracy, although clear improvements in the operating behavior of a test bench would thereby be possible. Either, sensors required for this are not available, or the significant expenses that the installation and use of known sensors would entail makes using said sensors impossible. Moreover, test specimens often have to be tested, which basically do not allow the tapping of measured values of variables of interest, or in which a corresponding measurement is not provided. An example of this is the generated internal torque of an internal combustion engine or electric motor, i.e., not the torque actually output at the output shaft, but the torque actually generated. This internal torque often cannot be measured directly.

For the reasons mentioned, multiple approaches are found in the prior art, in which sensors not present in real test bench environments are replaced by what are known as virtual sensors. For this purpose, desired measured variables, but not directly available, are often concluded by calculation, from present measured variables, often using the observer technology well known in control technology. Measurement signals generated in this way are often referred to as virtual measurement signals.

In this context, the scientific article "Nonlinear Observer for Closed-Loop Control of a Combustion Engine Test Bench," G. Reale et al., American Control Conference (2009) 4648-4653, describes the use of different state observers in an internal combustion engine test bench. In this case, based on the presented state observer estimates for the internal torque generated by the internal combustion engine, the rotational speeds of the internal combustion engine and the loading machine, and the differential angle between the internal combustion engine and the loading machine, are determined. However, the mentioned rotational speeds are also detected by measurement in the described case, which basically makes their estimation obsolete.

AT 519092 A4 discloses a method for damping control in an internal combustion engine test bench. In this case, an estimate of the internal specimen torque is determined on the basis of a measured shaft torque and a measured specimen rotational speed, but no details relating to the models used for the estimation and to the state observers derived therefrom are indicated, which makes the transfer of the presented concept to other test bench arrangements, such as electric motor test benches, significantly more difficult.

AT 522354 A4 describes the estimation of a shaft torque acting in the connection shaft of an engine test bench. Building on this estimation, a further estimation of a specimen torque is determined, which prevails in a specimen comprising at least two rotating masses. The specific embodiment of the estimator used is also not described in more detail here.

In contrast, DE 102020104314 A1 describes a model-predictive control of a test bench for testing drive components. In particular, predicted values of variables occurring in the test bench arrangement are estimated therein, such as the rotational speed of the connecting shaft and the torques generated by the loading machine and the specimen. Although a specific model of the test bench arrangement is disclosed in this document, since the focus of the disclosure there lies on the control of a state variable of the connection shaft, the modeling of the specimen torque takes place in a very rudimentary manner.

The cited prior art has some commonalities. A first notable point is that none of the documents describes a simultaneous estimation of specimen rotational speed and specimen torque generated by the specimen, but rather that at least one of the two variables is always measured. However, in many cases, precise information about the specimen rotational speed and specimen torque is a prerequisite for monitoring the power converted in a specimen, which can be of decisive importance in particular in the case of high-speed electric motors. Especially in the case of high-speed electric motors, the problem often arises on the test bench that the test bench control system can access neither a specimen rotational speed nor a specimen torque, but the power converted by the specimen must be taken into account in test bench operation, among other things in order to avoid thermal overloading of often valuable test specimens ("golden sample").

A further characteristic of the cited prior art is that no document describes an estimation of the specimen rotational speed in which the estimated specimen rotational speed is not already available as a measured variable in any case. Among other things, the often very high specimen rotational speeds must be monitored in electric motor test benches, which, however, can only be achieved by reliable estimation values in the event of a lack of measuring technology.

In addition, none of the cited documents shows how, in particular in the case of electric motor test benches, an internal specimen torque generated by a specimen can advantageously be modeled for a later estimation. In addition, for the models of specimen torques known from the prior art, it is largely unclear how these can be expediently expanded, for example for the purpose of increasing the model accuracy. Conceivable extension approaches are also often associated with a significantly increased model complexity, which can be disadvantageous in particular in practical application.

For the reasons mentioned, considerable difficulties sometimes arise in the practical use of the cited concepts. Possible consequences of these difficulties can extend from a lack of operational quality of a test bench, up to damage to the test bench and/or specimen.

SUMMARY OF THE INVENTION

It is therefore an object of the present invention to provide an improved method for simultaneous estimation of a specimen rotational speed and a specimen torque, which method can in particular be used flexibly, on automotive test benches in general and on electric motor test benches in particular.

This object is achieved according to the invention by the features of the independent claims. A test bench arrangement is assumed in which a rotating specimen, preferably in the form of an electric motor, is connected via a mechanical shaft connection to a rotating loading machine, and in which at least one rotational speed prevailing in the test bench arrangement, but preferably the load speed assumed by the loading machine, is measured.

In this case, the first step of the method according to the invention provides for the modeling of the rotational behavior of the entire test bench arrangement. In this case, the dynamic behavior of the test bench variables that are decisive for the rotational behavior of the test bench arrangement, such as load speed, specimen rotational speed, shaft torque, specimen torque, etc., is usually described in the form of a model, but at least the dynamic behavior of the measured rotational speed and of the specimen rotational speed assumed by the specimen is modeled. For this purpose, a first system of differential equations is specified which is preferably designed as a rotary multi-body system and which accordingly has at least two rotating masses or inertias which are connected to one another via a spring-damper element. The at least two rotating masses or inertias serve here to represent the specimen and loading machine, while the at least one spring-damper element represents the mechanical shaft connection therebetween. For the method according to the invention, it is important at this point that both the load torque generated by the loading machine, and the specimen torque generated by the specimen, represent input variables of the first system of differential equations. In this case, the load torque engages on the inertia representing the loading machine, whereas the specimen torque acts on the inertia representing the specimen.

The next method step represents the core of the present invention. A model of the specimen torque is specified therein on the basis of a second, autonomous system of differential equations which can have a high model order, the direct component being represented on the basis of a first subsystem and harmonics of the specimen torque being represented on the basis of a further, oscillating subsystem m. In this case, the m oscillating subsystems for modeling the m harmonics are preferably designed in the form of damped and/or undamped oscillators. In control theory, such systems for describing input variables are already known as "exosystems", but have hitherto not been used in test bench technology, although their use can lead to a series of surprisingly positive effects.

According to the invention, the first and the second system of differential equations are subsequently combined into an overall model, on the basis of which a state observer for estimating the specimen rotational speed and the specimen torque is designed in a further method step. In this case, the measured rotational speed represents an input and the specimen rotational speed to be estimated and the specimen torque to be estimated represent outputs of the state observer. Subsequently, estimates for the specimen rotational speed and the specimen torque are determined on the basis of the designed state observer, which values are used in a final method step for controlling at least one rotational variable prevailing on the test bench.

A first positive effect of using an autonomous exosystem for modeling the specimen torque results, in the present case, is in particular reached by the fact that the specimen torque occurring as an unknown input in the first system of differential equations can be replaced by the presented exosystem. The model thus produced can be understood as a new model comprising the rotational dynamics of the test bench arrangement and the dynamics of the specimen torque. Due to the autonomous character of the exosystem, the dependencies existing in the first system of differential equations are thus solved by unknown external variables. Since unknown external input variables can represent a significant obstacle in many applications of the observer technique, the quality of the determined estimations is often improved by this effect alone. If the estimation of the specimen rotational speed also takes place by means of a reconstruction of the state of the overall model on which the estimation is based, as is customary in the observation technique which is well known from control technology, the specimen torque is also estimated without additional effort in the specific case. The observation, mentioned at the outset, of the power converted in the specimen thus takes place substantially by itself.

A second advantage which is valuable in practice, in the case of the approach according to the invention, results from the structure of the second system of differential equations or from the structure of the exosystem for modeling the specimen torque. Considering that the accuracy of a reconstruction of a signal can be increased as desired by the addition of harmonics, this immediately opens up an approach for extension of the presented exosystem or the second system of differential equations. If additional oscillating subsystems in the form of oscillators are accordingly added, to take into account further harmonics, the number of state variables in the exosystem and thus in the resulting overall model increases. However, since the respective oscillating subsystems do not influence one another, but are decoupled from one another, as a result neither the exosystem nor the resulting overall model are made significantly more complex or more difficult to handle. Precisely this aspect is relevant in the assessment of the practical applicability of the method according to the invention, since in practice attempts are usually made to avoid high-order models. However, since the mentioned oscillating subsystems do not influence one another in any way, the only negative consequence of adding further oscillating subsystems, namely the necessity of taking into account additional state variables, faces in particular the great advantage of increased model accuracy. Of course, this property also applies to exosystems which have a high model order from the outset.

A further advantageous aspect of the method according to the invention can be linked to the stability of the exosystem used and the overall system resulting therefrom. Since the oscillating subsystems for modeling the harmonics are preferably damped and/or undamped oscillators, the eigenvalues of which are either on the imaginary axis or in the left-hand open half plane of the complex plane, the addition of further oscillators cannot fundamentally change the stability character of the resulting overall system. Since there is no risk with regard to a possible stability loss with respect to the stability of the models used for the estimation, even in the event of changes in the model parameters, the exosystem can be adapted, without concerns, to changing rotational variables of the test bench, or these can be tracked, for the purpose of modeling the specimen torque the test bench, during operation of the test bench, preferably a measured rotational speed such as the load speed assumed by the loading machine.

It should be noted at this point that, although the object of the present invention has its origin in the field of motor- and in particular electric motor test benches, the method according to the invention can also be applied in the case of a plurality of further test benches, for example in drive train test benches, roller test benches or component test benches. The specific control objective, which is achieved according to the method according to the invention with the aid of the estimated specimen torque and the estimated specimen rotational speed, is also to be interpreted broadly. In addition to the damping control already mentioned, in this regard primarily mass or inertial simulation and n-alpha operation are to be mentioned as further applications.

BRIEF DESCRIPTION OF THE DRAWINGS

The present invention is described in greater detail below with reference to FIGS. 1 to 6, which show schematic and non-limiting advantageous embodiments of the invention by way of example. In the figures

DETAILED DESCRIPTION

Figure 1:
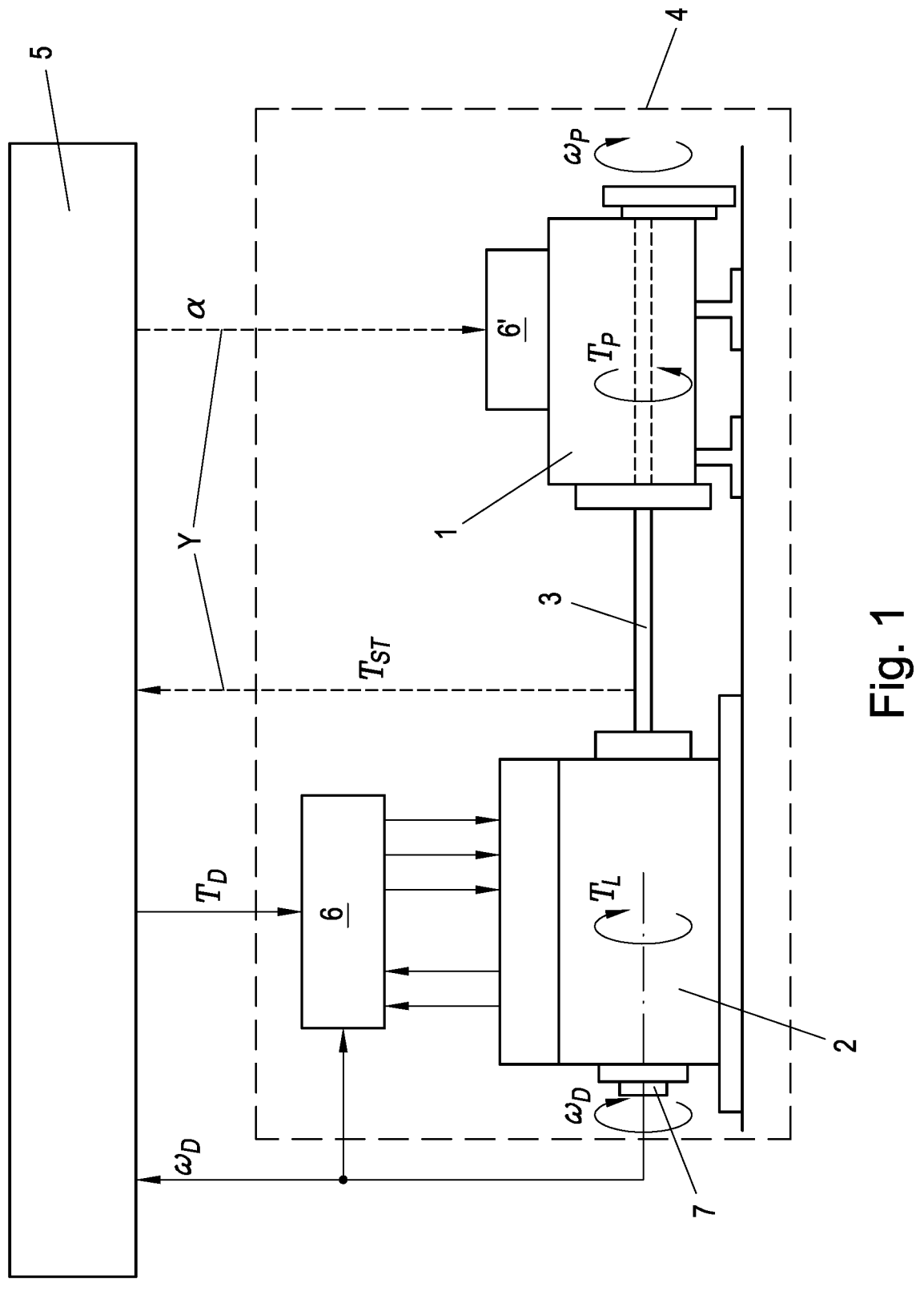
FIG. 1 shows a schematic view of a test bench arrangement

FIG. 1 shows a schematic view of the essential components in a motor test bench. In this case, a rotating specimen 1, preferably in the form of an electric motor or also internal combustion engine, is connected to a loading machine 2 via a connecting shaft 3, which loading machine applies a load torque to the specimen 1. The loading machine is generally designed as an electric machine. In the context of the present description, the unit consisting of the specimen 1, loading machine 2 and connecting shaft 3 is also referred to as a test bench arrangement 4. In the situation shown, an automation system 5 determines control variables for the operation of the test bench arrangement 4, specifically for the individual active components, and provides them to the test bench arrangement 4, which in particular also includes the specification of a loading machine torque $T_D$ of the loading machine 2. Besides the control variable for the loading machine torque $T_D$, the automation system 5 can also output a control variable a for the specimen 1. In this case, the control variable a can have a different meaning depending on the specimen 1—in the case of an internal combustion engine it can stand for a pedal position, throttle valve position or the like, in the case of an electric motor, its importance is often given as a percentage of a maximum torque which the specimen 1 can generate. At this point, it should be noted that the specimen 1 does not necessarily have to be connected to the automation system 5. In such cases, the specification of a control variable a is no longer carried out by the automation system 5, but rather must take place in a different way, for example by a specification by a test bench operator or by a control device provided on the specimen 1.

The control variables are subsequently converted by an actuating device 6 of the loading machine 2 or an actuating device 6' of the specimen 1 into corresponding control variables with which they are controlled. If the loading machine 2 is designed, as is often the case, as an electric machine, for example as a synchronous or asynchronous machine, a loading machine torque $T_D$, transmitted as a control variable, is implemented in the form of an air gap torque $T_L$. As a control variable for generating this air gap torque $T_L$, winding currents or winding voltages of the loading machine 2 can then be used in this case. In this case, the air gap torque $T_L$ is generated by the loading machine 2 in a known manner, and engages on the rotor of the loading machine 2.

The actual values of the control variables are determined by means of suitable sensors and transmitted to the automation system 5 via suitable signal lines, such as the actual value of the angular speed of the loading machine 2 shown in FIG. 1, which is also referred to in the following as the "load angular velocity" $\omega_D$. The load angular velocity $\omega_D$ can be detected, for example, by means of a rotary encoder 7. In the method according to the invention, the specimen angular velocity $\omega_\rho$ is not available as a measured variable, and also the shaft torque $T_{ST}$ transmitted by the connection shaft 3 is often not available in the form of a measured variable, which is indicated by the dashed signal lines Y in FIG. 1. Angular velocities $\omega$ and rotational speeds n of the test bench arrangement 4, for example specimen angular velocity $\omega_\rho$ and specimen rotational speed $n_\rho$, are in this case connected to one another by the known expression $\omega=\pi n/30$ and are to be considered synonymous with regard to their effect on the method according to the invention. In order to make the following text and the mathematical description of the above-mentioned models consistent, in the following, angular velocities will predominantly be used, without limiting the generality.

Figure 2:
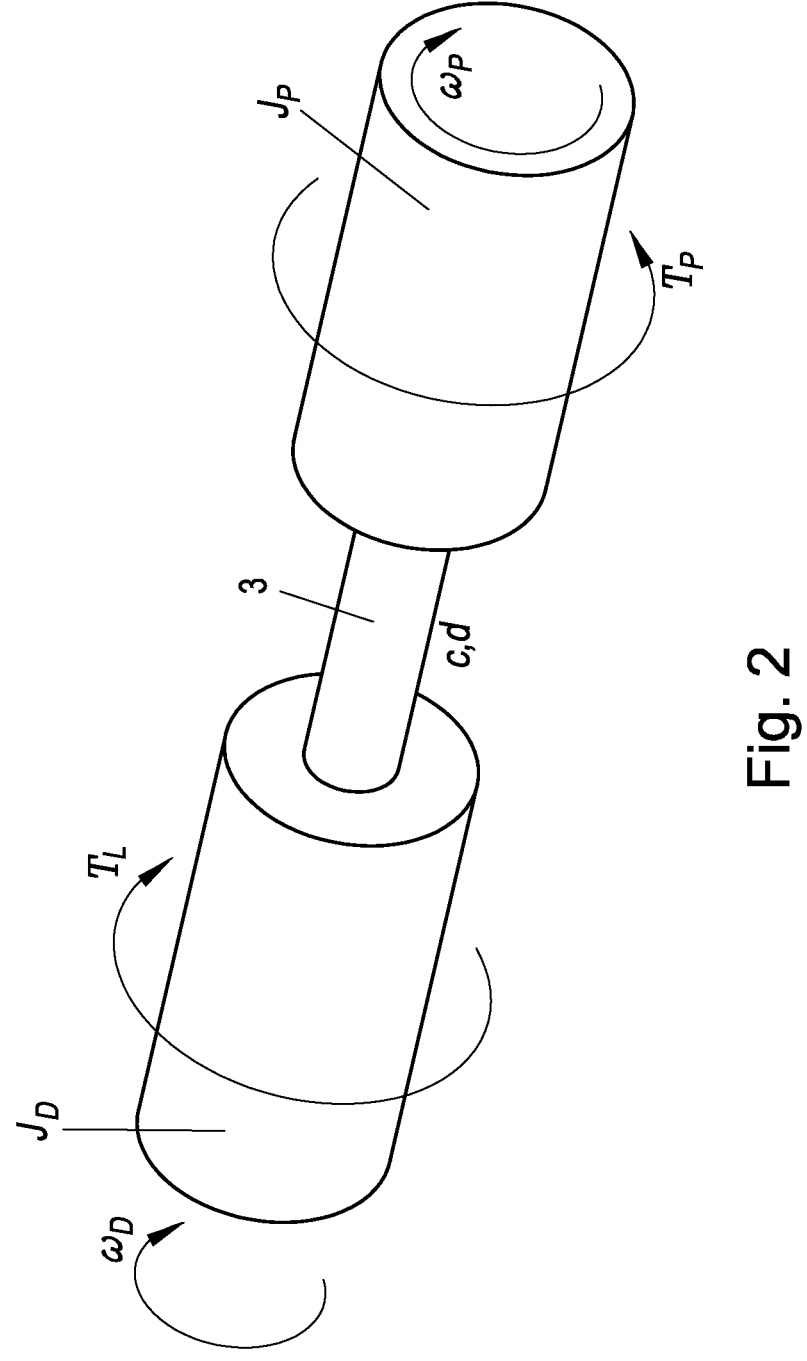
FIG. 2 shows a schematic view of a model of a dual-mass oscillator

The first step of the method according to the invention provides the specification of a first system of differential equations for modeling the rotational behavior, hereinafter also referred to as oscillation behavior, of the test bench arrangement 4. For this purpose, a rotary multi-body system is preferably applied, the simplest embodiment of which is a two-mass oscillator. FIG. 2 shows such a two-mass oscillator. In addition to the test bench variables that are decisive for the oscillation behavior, of shaft torque $T_{ST}$, air gap torque $T_L$ generated by the loading machine 2, specimen torque $T_P$, loading machine angular velocity $\omega_\rho$, and specimen angular velocity $\omega_\rho$, FIG. 2 shows the shaft stiffness c and the shaft damping d for the description of the mechanical connection shaft 3 between the specimen 1 and the loading machine 2, and the specimen moment of inertia $J_\rho$ and the loading machine moment of inertia $J_D$. These parameters can be assumed to be known. On the basis of the two-mass oscillator shown in FIG. 2, a well known first system of differential equations can be used to describe the rotational behavior of the test bench arrangement 4 in the form of $$\frac{d}{dt}\underbrace{\begin{bmatrix}\Delta\varphi \\ \omega_D \\ \omega_P\end{bmatrix}}_{x} = \underbrace{\begin{pmatrix} 0 & 1 & -1 \\ -\dfrac{c}{J_D} & -\dfrac{d}{J_D} & \dfrac{d}{J_D} \\ \dfrac{c}{J_P} & \dfrac{d}{J_P} & -\dfrac{d}{J_P}\end{pmatrix}}_{A}\begin{bmatrix}\Delta\varphi \\ \omega_D \\ \omega_P\end{bmatrix} + \underbrace{\begin{pmatrix} 0 \\ \dfrac{-1}{J_D} \\ 0\end{pmatrix}}_{b_L}T_L + \underbrace{\begin{pmatrix} 0 \\ 0 \\ \dfrac{1}{J_P}\end{pmatrix}}_{b_P}T_P$$

with the output equation $$\omega_D = \underbrace{(0 \quad 1 \quad 0)}_{c_A}\begin{bmatrix}\Delta\varphi \\ \omega_D \\ \omega_P\end{bmatrix}$$

where $\Delta\varphi$ stands for the difference rotational angle between the test specimen 1 and loading machine 2. The variables x, A, $b_L$, $b_\rho$ and $c_A$ in this case stand, in corresponding order, for the state vector, the dynamic matrix, the first and second input vector, and for the output vector of the first system of differential equations, and result from the modeling. In the present case, the output equation describes the angular velocity $\omega_D$ of the loading machine 2, which is often customary, since the associated load rotational speed is typically available as a measured variable. Different further embodiments of the output equation and thus of the output variable are conceivable by an alternative choice of the output vector.

Like each model of a real physical system, also the first system of differential equations according to the invention represents a simplified, modeled abstraction of the real behavior of the modeled test bench arrangement 4. Thus, in the formulation of the model, the mass inertia of the elastic connecting shaft can be added in equal proportions to the inertia $J_D$ and to the inertia $J_P$. In addition, it is assumed that all system components are linear elements. Possible nonlinear features of the test bench arrangement 4, such as shaft play, nonlinear rigidity, or static friction, are accordingly not taken into account. The actuator dynamics introduced by the loading machine 2, which are usually expressed by a combination of dead time and PT1 behavior during the conversion of the control variable $T_D$ into an air gap torque $T_L$, are also disregarded. If the actuator dynamics are disregarded, the air gap torque $T_L$ in particular corresponds the control variable $T_D$. By taking into account the currently disregarded features, further, more complex models of the test bench arrangement 4 could also be specified directly, in the form of system of differential equations s. However, the first system of differential equations shown is sufficient for describing the method according to the invention. For the further considerations, the model parameters are assumed to be known. Based on the model indicated, the formulation of the general object of the present invention can be specified for the embodiment shown and for better understanding, namely as the determination of a method for estimating the variables $\omega_\rho$ and $T_\rho$.

As mentioned, in order to achieve this object, a second system of differential equations for describing the specimen torque $T_\rho$ is specified. The generated specimen torque $T_P$ is modeled using a second system of differential equations, the direct component of the specimen torque $T_\rho$ being modeled on the basis of a first subsystem of the second system of differential equations, and m harmonics of the specimen torque $T_\rho$ being modeled on the basis of a number m of further oscillating subsystems of the second system of differential equations, in the form of damped and/or undamped oscillators.

In the specific embodiment, three (m=3) harmonics are considered, as a result of which the second system of differential equations assumes the form $$
\frac{d}{dt}\underbrace{\begin{bmatrix} z_0 \\ z_{1,1} \\ z_{1,2} \\ z_{2,1} \\ z_{2,2} \\ z_{3,1} \\ z_{3,2} \end{bmatrix}}_{z} = \underbrace{\begin{pmatrix} 0 & 0 & 0 & 0 & 0 & 0 & 0 \\ 0 & 0 & -\zeta_1 & 0 & 0 & 0 & 0 \\ 0 & \zeta_1 & 0 & 0 & 0 & 0 & 0 \\ 0 & 0 & 0 & 0 & -\zeta_2 & 0 & 0 \\ 0 & 0 & 0 & \zeta_2 & 0 & 0 & 0 \\ 0 & 0 & 0 & 0 & 0 & 0 & -\zeta_3 \\ 0 & 0 & 0 & 0 & 0 & \zeta_3 & 0 \end{pmatrix}}_{S} \begin{bmatrix} z_0 \\ z_{1,1} \\ z_{1,2} \\ z_{2,1} \\ z_{2,2} \\ z_{3,1} \\ z_{3,2} \end{bmatrix}
$$

with the output equation $$
T_P = \underbrace{(1 \quad 1 \quad 0 \quad 1 \quad 0 \quad 1 \quad 0)}_{c_s} \begin{bmatrix} z_0 \\ z_{1,1} \\ z_{1,2} \\ z_{2,1} \\ z_{1,2} \\ z_{3,1} \\ z_{3,2} \end{bmatrix}
$$

Here too, analogously to the first system of differential equations, variables z, S and $c_s$ are specified, which, in corresponding order, denote the state vector with a number of 2m+1 state variables z, the dynamic matrix, and the output vector of the second system of differential equations. In this case, using the state variable $z_0$, which adheres to the differential equation $$
\frac{d}{dt}z_0 = 0
$$

the direct component of the specimen torque $T_P$ is described.

The remaining state variables $z_{k,1}$, $z_{k,2}$ are always to be viewed in pairs of two, each of which pairs is to be attributed the k-th oscillating subsystem. In this case, the control variable k is used here to indicate the oscillating subsystems and the associated variables. Specifically, the oscillating subsystems are understood to be those parts of the system of differential equations which are each formed by mutually influencing state variables of the state vector. Accordingly, for each of these oscillating subsystems, for the state variables, $z_{k,1}$ and $z_{k,2}$ the following vector-valued differential equation applies $$
\frac{d}{dt}\begin{bmatrix} z_{k,1} \\ Z_{k,2} \end{bmatrix} = \begin{pmatrix} 0 & -\zeta_k \\ \zeta_k & 0 \end{pmatrix} \begin{bmatrix} z_{k,1} \\ Z_{k,2} \end{bmatrix},
$$

which is known to correspond to a harmonic oscillator of the angular frequency $\zeta_k$.

The eigenvalues of this subsystem, at $\pm j\zeta_k$, are on the imaginary axis of the complex plane, and cannot leave it, even in the case of variations of the angular frequency $\zeta_k$. An expansion possibility of this oscillator is provided by taking into account damping by means of a suitable damping factor.

Such a modification would result in a damped oscillator having the differential equation $$
\frac{d}{dt}\begin{bmatrix} z_{k,1} \\ z_{k,2} \end{bmatrix} = \begin{pmatrix} -\eta_k & -\zeta_k \\ \zeta_k & -\eta_k \end{pmatrix}\begin{bmatrix} z_{k,1} \\ z_{k,2} \end{bmatrix},
$$

the eigenvalues of which in the case of a positive and real damping factor $\eta_k>0$ generally lie in the left-hand half of the complex plane. The property that the eigenvalues of such an oscillator can never come to lie in the right-hand half of the complex plane is advantageous in particular in cases in which the second system of differential equations for modeling the specimen torques is $T_\rho$ is adapted to a variable of the test bench arrangement 4 which changes during the operation of the test bench, for example to the angular velocity $\omega_\rho$.

Starting from an initial state different from zero, the two variables $z_{k,1}$ and $z_{k,2}$ each realise a sinusoidal profile which is phase-shifted by 90 degrees relative to one another. If one of these two state variables is selected, a single harmonic of a specimen torque can thus consequently be $T_\rho$ and an entire harmonic specimen torque $T_\rho$ can be described by a sum of multiple harmonics determined in this way.

Figure 3:
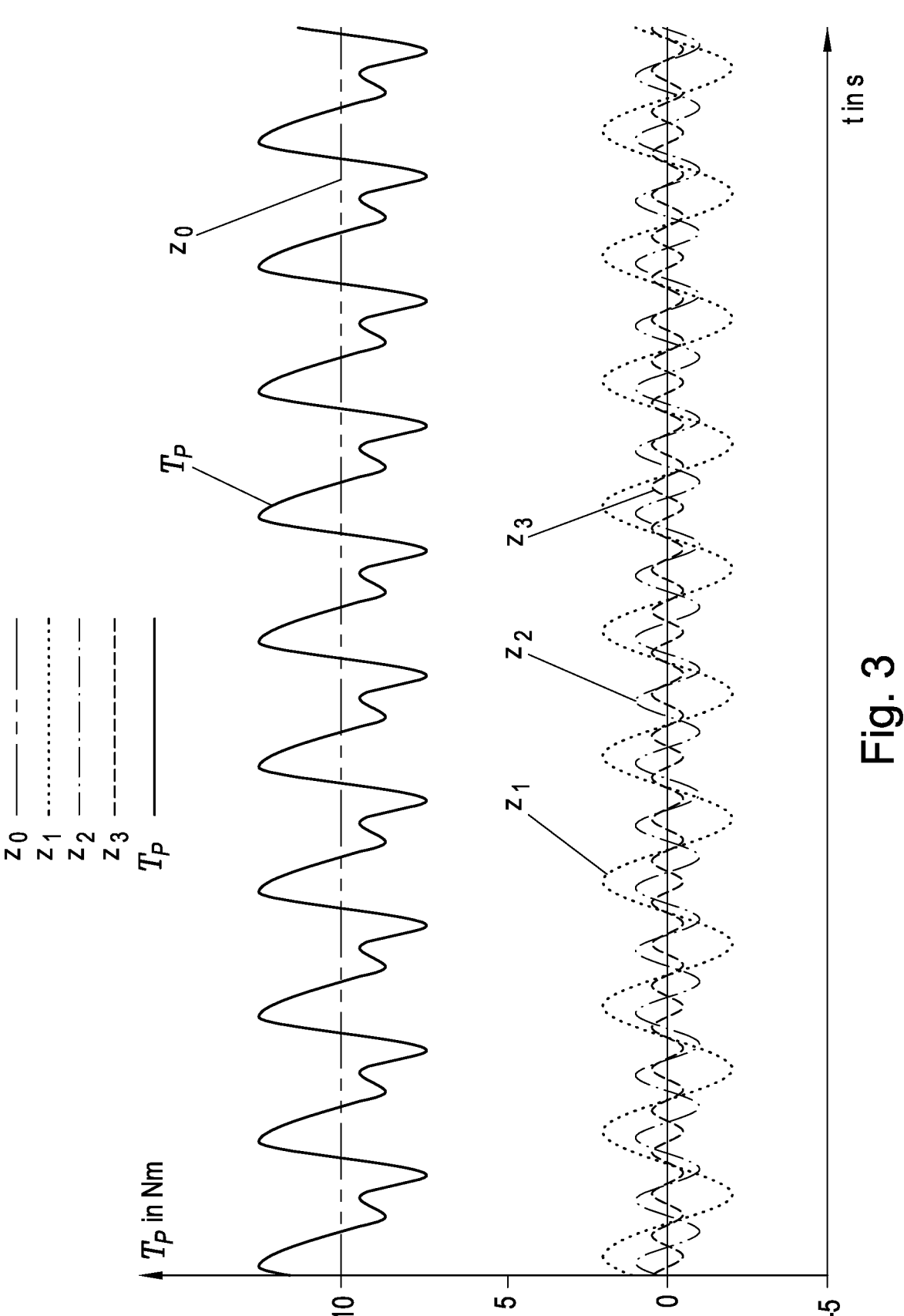
FIG. 3 shows a curve, by way of example, of a specimen torque

From the structure of the output vector $c_s$, it can be seen that, to form the output variable $T_\rho$, the state variable $z_0$ and precisely one associated state variable of each of the oscillating subsystems are summed. FIG. 3 shows, in this connection, a possible profile of a specimen torque $T_\rho$ formed in this way.

In order to parameterize the angular frequencies $\zeta_k$, for example integer multiples of the load angular velocity $\omega_D$ are used, which leads to the relationship $$
\zeta_k = k\omega_D
$$

The angular frequencies $\zeta_k$ thus become functions of the load angular velocity $\omega_D$, which can be used to adapt the angular frequencies $\zeta_k$, during operation, to a possibly changing load angular velocity $\omega_D$. Instead of the load angular velocity $\omega_D$, however, other rotational variables of the test bench arrangement 4 can also be used for parameterizing the angular frequencies $\zeta_k$. Moreover, it is also possible to set the angular frequencies $\zeta_k$ once, at the beginning of the operation, in the manner described, but subsequently no longer to change them and accordingly keep them constant. In electric motor test benches, it is often advantageous, when selecting the frequencies $\zeta_k$, to take into account an integer pole pair number p, which results in $$
\zeta_k = kp\omega_D
$$

and can contribute to a reduction in the resulting model order.

It should be noted at this point that the selection of the frequencies $\zeta_k$ can also be carried out in a completely different manner, for example by using crooked ratios between the frequencies $\zeta_k$ and the load angular velocity $\omega_D$. The frequencies $\zeta_k$ can, however, also be easily selected by a person skilled in the art.

An extension, mentioned at the outset, of the second system of differential equations, for increasing the model accuracy, can easily take place by adding further oscillators, as a result of which the number m would be increased. It should also be noted that successive harmonics need not necessarily be used. For example, only odd harmonics or only even harmonics, or any desired selection of harmonics, can be used.

For the actual determination of estimates for $\omega_\rho$ and $T_\rho$, the first and the second differential equations are combined to form an overall system. For more detailed description of this step, firstly, based on the previously introduced abbreviations for the system parameters, the first system of differential equations is written in the compact form $$\frac{d}{dt}x = Ax + b_L T_L + b_P T_P$$

$$\omega_D = c_A z$$

and the second system of differential equations is written in the compact form $$\frac{d}{dt}z = Sz$$

$$T_P = c_s z$$

If the input $T_\rho$ of the first system of differential equations is replaced by the output $T_\rho$ of the second system of differential equations, the overall system $$\frac{d}{dt}\begin{bmatrix} x \\ z \end{bmatrix} = \begin{pmatrix} A & b_P c_S \\ 0_x & S \end{pmatrix}\begin{bmatrix} x \\ z \end{bmatrix} + \begin{pmatrix} b_L \\ 0_z \end{pmatrix}T_L$$

$$\omega_D = (c_A \quad 0_z)\begin{bmatrix} x \\ z \end{bmatrix},$$

results, where $0_x$ and $0_z$ stand for zero matrices of a suitable dimension. A wide variety of approaches to design a state observer for estimating the state vector $$\begin{bmatrix} x \\ z \end{bmatrix}$$

exist for such a linear system.

In a preferred manner, however, the well-known Luenberger observer can be used, which, however, is in no way to be understood as limiting. As is known, a Luenberger observer comprises a copy of the system of differential equations, which describes the dynamics of the variables to be estimated, and a correction term, which, in the specific case, corresponds to the observer differential equation $$\frac{d}{dt}\begin{bmatrix} \hat{x} \\ \hat{z} \end{bmatrix} = \begin{pmatrix} A & b_P c_S \\ 0_x & S \end{pmatrix}\begin{bmatrix} \hat{x} \\ \hat{z} \end{bmatrix} + \begin{pmatrix} b_L \\ 0_z \end{pmatrix}T_L + K\left(\omega_D - (c_A \quad 0_z)\begin{bmatrix} \hat{x} \\ \hat{z} \end{bmatrix}\right)$$

Herein, $\hat{x}$ and $\hat{z}$ stand for the estimates of the state vectors x and z to be determined. In this case, the vectorial correction gain K is usually selected in such a way that the dynamic matrix $\hat{A}$ of the differential equation of the estimation error $$e = \begin{bmatrix} x \\ z \end{bmatrix} - \begin{bmatrix} \hat{x} \\ \hat{z} \end{bmatrix},$$

assumes predetermined eigenvalues, which represents a procedure that is well known in control technology. The dynamic matrix of the differential equation of the estimation error e results from the above equation directly as $$\hat{A} = \left(\begin{pmatrix} A & b_P c_S \\ 0_x & S \end{pmatrix} - K(c_A \quad 0_z)\right),$$

in which the effect of the correction gain K on the parameters of the matrix and thus their eigenvalues can be clearly seen. In addition to the direct specification of eigenvalues, further approaches to the choice of K are conceivable in this case. Often, for this purpose, the likewise well known LQR approach is used.

If the cited observer differential equation is expanded in a further step by the vector-valued output equation $$\begin{bmatrix} \hat{\omega}_P \\ \hat{T}_P \end{bmatrix} = \begin{pmatrix} (0 \quad 0 \quad 1) & 0_z \\ 0_x & c_S \end{pmatrix}\begin{bmatrix} \hat{x} \\ \hat{z} \end{bmatrix}$$

the desired estimates of specimen angular velocity $\hat{\omega}_P$ and specimen torque $\hat{T}_P$ result as outputs of the state observer completed therewith.

An advantage of the method according to the invention that is to be highlighted in this context is that the presented output equation of the state observer can be expanded easily, for example in order to additionally determine an estimate $\hat{T}_{ST}$ for the shaft torque $T_{ST}$. In a preferred embodiment of the present invention, the output equation of the state observer is supplemented for this purpose by a line in which, in order to determine the estimate $\hat{T}_{ST}$, the known parameters of the shaft stiffness c and shaft damping d are used, which leads to the output equation $$\begin{bmatrix} \hat{\omega}_P \\ \hat{T}_P \\ \hat{T}_{ST} \end{bmatrix} = \begin{pmatrix} (0 \quad 0 \quad 1) & 0_z \\ 0_x & c_S \\ (-c \quad -d \quad d) & 0_z \end{pmatrix}\begin{bmatrix} \hat{x} \\ \hat{z} \end{bmatrix}$$

In an analogous manner, yet further output variables can be formed, for example for an estimate of the load angular velocity $\hat{\omega}_\rho$. The combination of multiple already existing output variables to form new output variables can also be advantageous in this context. In this case, it is clear from the observer differential equation of the described embodiment that the air gap torque $T_L$ and the load angular velocity $\omega_\rho$ enter into this system as input variables, which usually does not represent an obstacle, since both variables represent unknown variables only in extremely unusual cases. However, it should be noted at this point that both the air gap torque $T_L$ and the load angular velocity $\omega_\rho$, in the implementation of the method according to the invention, can be replaced by other angular velocities or torques prevailing in the test bench arrangement 4, for example by the shaft torque $T_{ST}$ and an angular velocity of the shaft connection 3. In such cases, only the first system of differential equations needs to be adapted accordingly, but the basic procedure does not change. By adapting the first system of differential equations, it is also possible to take into account the implementation of a control variable $T_D$ in an air gap torque $T_L$. For this purpose, the relationship between the control variable $T_D$ and air gap torque $T_L$ is typically modeled by a combination of dead time and PT1 behavior, dead time advantageously being able to be described in this case on the basis of a Pade approximation.

If, as described above, the angular frequencies are selected as functions of the $\zeta_k$ load angular velocity $\omega_D$ or as functions of another rotational variable prevailing in the test bench arrangement 4, and the correction gain K is, as is often customary, as a function of the remaining parameters of the dynamic matrix $\hat{A}$, a dependency of the resulting state observer on the load angular velocity $\omega_\rho$ or on other rotational test bench variables, on which the angular frequencies $\zeta_k$ depend. In such cases, the state observer is automatically adapted to a possibly changing load angular velocity Wo or is adapted to a possibly changing different rotational variable of the test bench arrangement 4, which can improve the operating behavior of the test bench arrangement 4, sometimes to a decisive extent.

Figure 4:
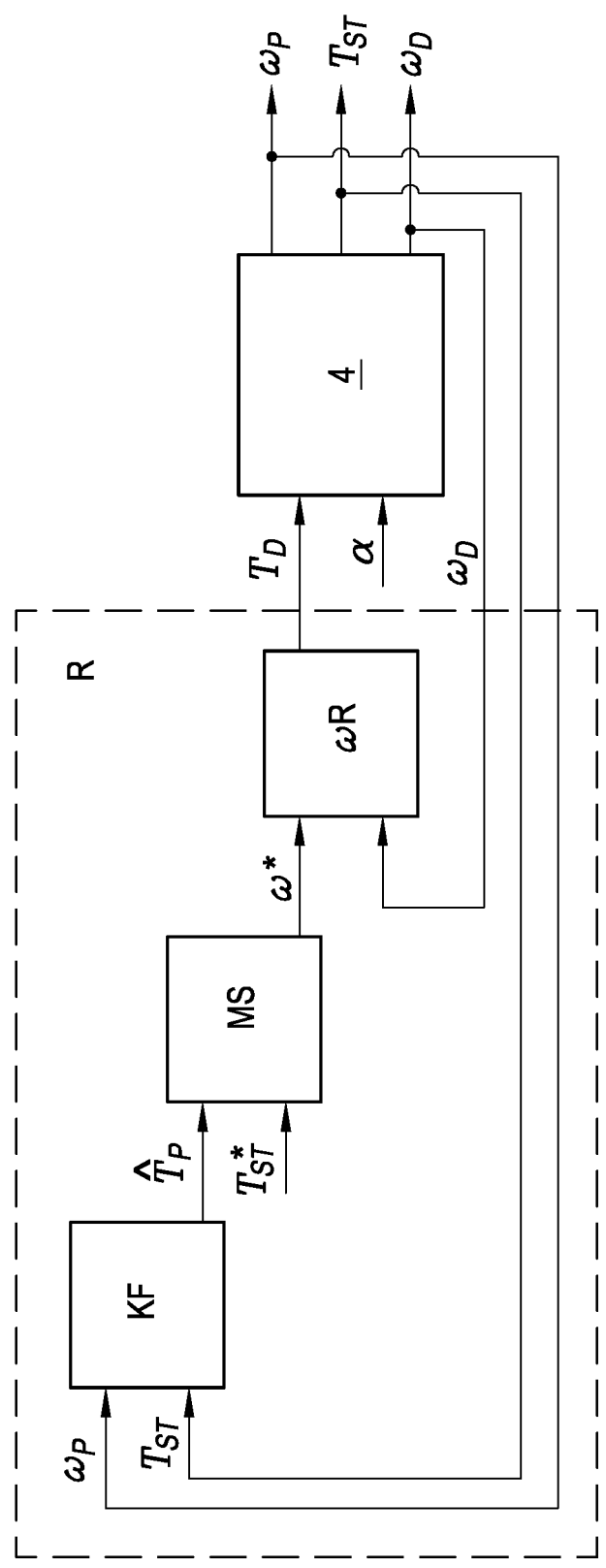
FIG. 4 shows a block diagram of a control system by way of example, without the estimation according to the invention of specimen rotational speed and specimen torque
Figure 5:
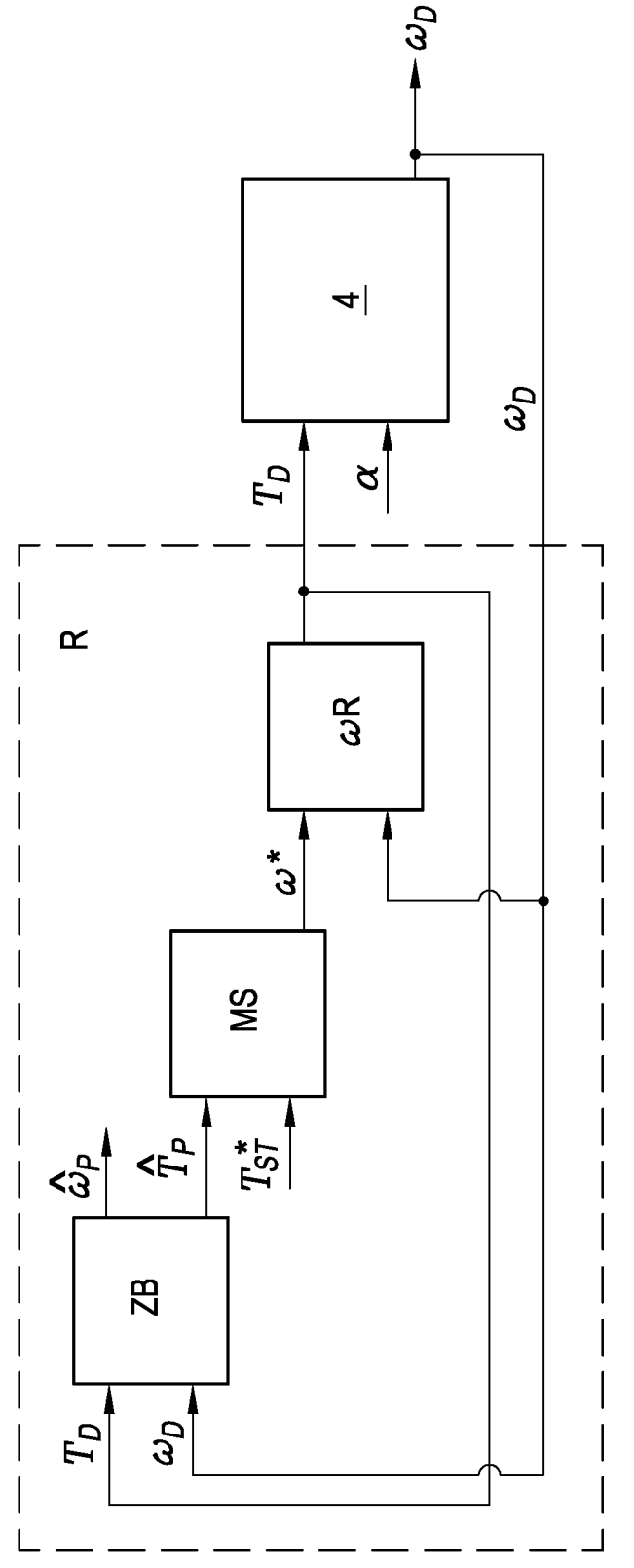
FIG. 5 shows a block diagram of a control system by way of example, with an estimation according to the invention of specimen rotational speed and specimen torque

The way in which the estimates $\hat{\omega}_\rho$ and $\hat{T}_\rho$ can be used for controlling the test bench arrangement 4 is shown below with reference to FIGS. 4 and 5. FIG. 4 is a block diagram of a control loop which is used in this form in particular in electric motor test benches for what is known as highly dynamic shaft torque control. This control loop is implemented, for example, in the automation system 5, preferably as software on microprocessor-based hardware of the automation system 5. However, other implementations are also conceivable, for example in the form of an integrated circuit (e.g., FPGA, ASIC, etc.).

The aim of such a highly dynamic shaft torque control is usually that of tracking the shaft torque $T_{ST}$, transmitted from the shaft connection 3, using predetermined time curves of a target shaft torque $\hat{T}_{ST}$, wherein such target shaft torques may have highly dynamic components and may fundamentally change within a few milliseconds. Torques to be controlled and the angular velocities to be controlled are often also referred to in this context as "control torque" and "control angular velocity." In order to achieve the aforementioned control objective, starting from the specimen torque $T_\rho$ and the current target shaft torque $\hat{T}_{ST}$ a desired angular velocity $\omega^*$ is determined, which takes place in the embodiment shown in FIG. 4 in the mass simulation block MS. This target angular velocity $\omega^*$ is subsequently adjusted by the controller $\omega R$ and is usually selected such that the shaft torque $T_{ST}$ occurring in the process assumes the predetermined target value $\hat{T}_{ST}$ (with a certain predefined control deviation). Since the specimen torque $T_\rho$, for the reasons mentioned, is usually not known, a Kalman filter KF is often used for determining said torque, in which filter inter alia the measured shaft torque $T_{ST}$ functions as an input. The conventional implementation of this highly dynamic shaft torque control shown in FIG. 4 thus presupposes that the load angular velocity $\omega_D$, the specimen angular velocity $\omega_\rho$ and the shaft torque $T_{ST}$ are detected on the test bench and are available to the test bench control.

However, for the reasons mentioned, in particular in electric motor test benches, neither the specimen angular velocity $\omega_\rho$ nor the shaft torque $T_{ST}$ is measured, which is why this procedure is often not possible. Moreover, the power converted in the specimen 1 often has to be monitored, for safety considerations, for which purpose the specimen torque $T_\rho$ generated by the specimen 1 should also be known. In addition, in the cases in which they are present, rotary encoders provided on electric motors supply the desired measurement signal often at only very low sampling rates, such as at 100 Hz. Since modern test bench controllers R are usually designed having sampling rates of at least 5 kHz, this circumstance alone can greatly impair the dynamics of the test bench controller R used.

In order that the concept of the shaft torque control can also be used without measurement of the specimen angular velocity $\omega_\rho$, the existing control concept is expanded by the state observer according to the invention. The block diagram shown in FIG. 5 can thus be realized, whereby the use of the highly dynamic shaft torque control is possible even in cases in which neither the specimen angular velocity $\omega_\rho$ nor the shaft torque $T_{ST}$ are available as measured variables. In this case, a further advantage of the method according to the invention often results from the fact that the above-described Kalman filter KF for the original estimation of the specimen torque $T_\rho$ can be dispensed with.

Figure 6:
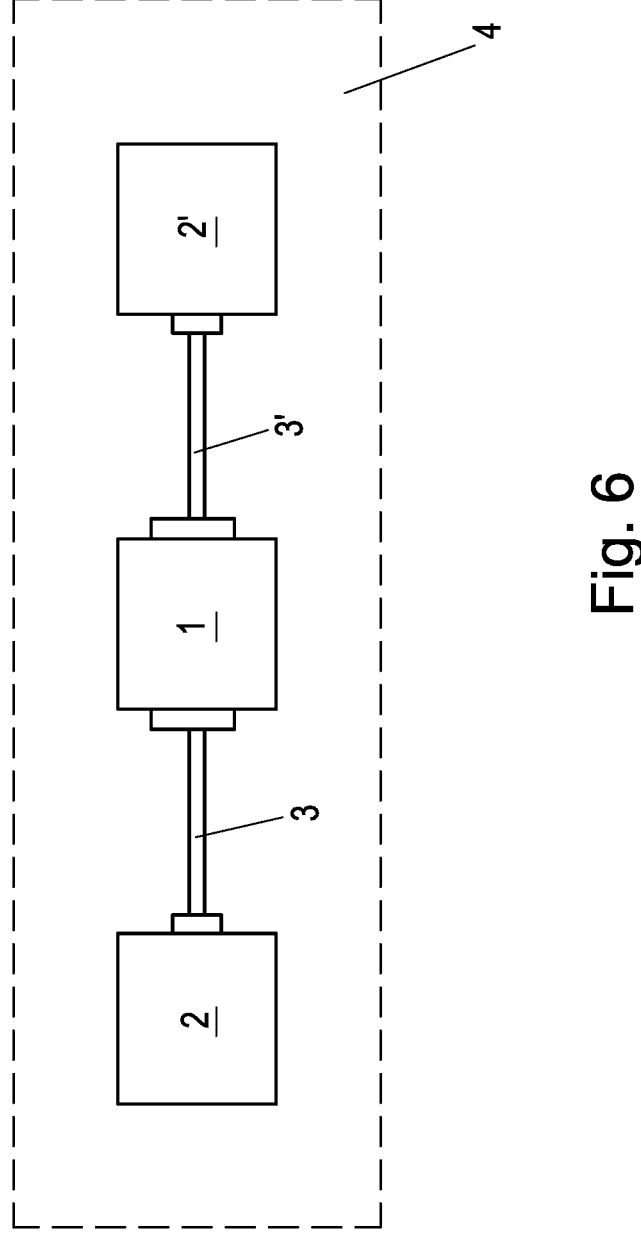
FIG. 6 shows a test bench arrangement comprising two loading machines

In addition to the embodiment explained with reference to FIGS. 4 and 5, the method according to the invention can be used for solving a plurality of further control problems relating to testing technology, such as mass simulation, damping control, etc. In addition to these problems of control technology, further test bench topologies can be mentioned as further fields of application, in particular multi-axis test benches being highlighted. Such a structure is shown in FIG. 6. In this case, the rotating specimen 1, which can now represent a transmission, for example, is connected via at least one further mechanical shaft connection 3' to at least one further rotating loading machine 2'. The at least one further rotating loading machine 2' can in this case be used in addition to the already existing rotating loading machine 2, as an actuator in the control of the test bench arrangement 4, the estimates according to the invention of specimen angular velocity $\omega_\rho$ and specimen torque $T_\rho$ being able to be used without limitation.

The invention claimed is:

1. A method for controlling a test bench arrangement in which a rotating specimen is connected to a rotating loading machine via a mechanical shaft connection and in which at least one angular velocity prevailing in the test bench arrangement is measured, the rotational behavior of the test bench arrangement and thus the dynamic behavior of at least one of the measured angular velocity and of a specimen angular velocity prevailing in the specimen being modeled using a first system of differential equations, characterized in that the specimen torque generated by the specimen is modeled using a second system of differential equations, the direct component of the specimen torque being modeled on the basis of a first subsystem of the second system of differential equations, and m harmonics of the specimen torque being modeled on the basis of a number m of further oscillating subsystems of the second system of differential equations in the form of oscillators selected from the group consisting of damped oscillators and undamped oscillators, a state observer for estimating the specimen angular velocity and the specimen torque is designed based on the first and the second system of differential equations, the measured angular velocity representing an input of the state observer, estimates of the specimen angular velocity and of the specimen torque are determined by means of the state observer, and the determined estimates selected from the group of the specimen angular velocity and of the specimen torque are used to control a component selected from the group consisting of at least one control angular velocity prevailing in the test bench arrangement and at least one control torque prevailing in the test bench arrangement.

2. The method according to claim 1, wherein, by means of the state observer, in addition to the estimates of the specimen angular velocity and of the specimen torque an estimated component selected from the group consisting of an estimate of a shaft torque and and/or an estimate of a load angular velocity are determined, which are also used to control the component selected from the group consisting of the at least one control angular velocity prevailing in the test bench arrangement and the at least one control torque prevailing in the test bench arrangement.

3. The method according to claim 1, wherein the parameters of the second system of differential equations for modeling the specimen torque are selected as functions of at least one rotational variable which changes during the operation of the test bench arrangement and prevails in the test bench arrangement, in order to adapt the parameters of the second system of differential equations, and thus the second system of differential equations, to changes in the at least one rotational variable prevailing in the test bench arrangement.

4. The method according to claim 3, wherein the parameters of the state observer designed on the basis of the first and second system of differential equations are selected as functions of at least one rotational variable which changes during the operation of the test bench arrangement and prevails in the test bench arrangement, in order to adapt the parameters of the state observer, and thus the state observer, to changes in the at least one rotational variable prevailing in the test bench arrangement.

5. The method according to claim 1, wherein the rotating specimen is connected via at least one further mechanical shaft connection to at least one further rotating loading machine, and that the at least one further rotating loading machine is used in addition to the existing rotating loading machine as an actuator in the control of the component selected from the group consisting of the at least one control angular velocity prevailing in the test bench arrangement and the at least one control torque prevailing in the test bench arrangement.

6. A test bench comprising a test bench arrangement in which a rotating specimen is connected to a rotating loading machine via a mechanical shaft connection and which is designed to detect, by measurement, at least one angular velocity prevailing in the test bench arrangement, and an automation system which is designed to model the rotational behavior of the test bench arrangement and thus the dynamic behavior of at least the measured angular velocity and a specimen angular velocity prevailing in the specimen using a first system of differential equations, characterized in that the automation system is further designed to model the specimen torque generated by the specimen using a second system of differential equations and thereby model the direct component of the specimen torque on the basis of a first subsystem of the second system of differential equations, and model m harmonics of the specimen torque on the basis of a number m of further oscillating subsystems of the second system of differential equations in the form of oscillators selected from the group consisting of damped oscillators and undamped oscillators, on the basis of the first and the second differential equations, to design a state observer for estimating the specimen angular velocity and the specimen torque, the measured angular velocity representing an input of the state observer, to determine the specimen angular velocity and the specimen torque by means of the state observer, and to use the determined estimates of specimen angular velocity and specimen torque for controlling a component selected from the group consisting of at least one control angular velocity prevailing in the test bench arrangement and at least one control torque prevailing in the test bench arrangement.

* * * * *